2,753,471
CONSTANT SPEED D. C. MOTOR

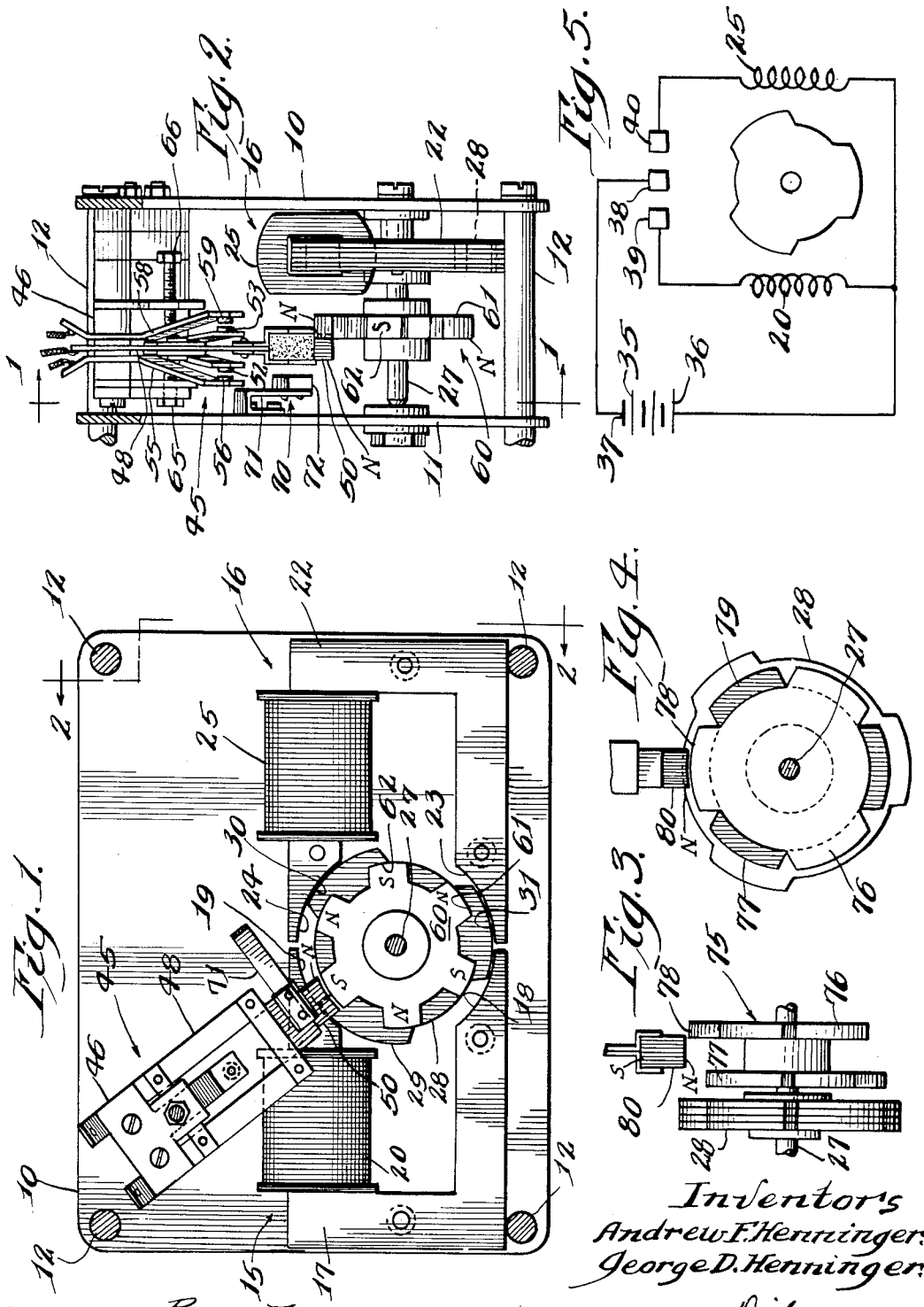

Andrew F. Henninger and George D. Henninger, Chicago, Ill.

Application March 26, 1953, Serial No. 344,782

1 Claim. (Cl. 310—46)

Our invention relates to a constant speed D. C. motor, and more particularly to a motor of the type shown in our prior U. S. Patents Nos. 2,266,037 and 2,282,582.

The motor with which our invention is concerned derives its power from a D. C. source, such as a dry battery, and it may be designed and constructed to operate on low voltage, such as six volts, for example. By varying the structure in conventional respects, other desired voltages may be employed.

The motor is characterized by operation at constant speed despite rather wide variations in mechanical load and applied voltage. Its speed is substantially independent of temperature variations over a wide range. Also, current consumption is unusually low with the result that the motor is able to operate at its constant speed for a long period before battery replacement is necessary. In addition, the motor is reliably self-starting.

As more fully set forth in the aforesaid patents, the constant speed characteristic of our prior motor is achieved through the use of a vibratable reed which is tuned accurately to a desired frequency of vibration. The reed, in turn, is driven by rotating parts of the motor through a magnetic coupling. The vibrating reed actuates a switch in the field circuit to establish a varying field which drives the armature at the desired constant speed.

One of the difficulties experienced in commercial embodiments of our prior motor was that the relationship between the vibrating reed and the switch involved a more or less critical adjustment. Extended motor operation sometimes upset this adjustment with the result that motor operation became erratic, and occasionally the motor became non-self-starting. We have found that both difficulties can be overcome by increasing the amplitude of the vibrating reed, and increasing the magnetic stress used in the reed driving system.

One object of our invention, therefore, is to improve our prior motor by providing means which increases the amplitude of reed vibration.

Another object of the invention is to provide increased magnetic stress for orienting the armature to insure reliable self-starting.

Another object of the invention is to provide means which effectively limits the increased vibration amplitude of the speed controlling reed. This improves the constant speed characteristic of the motor and minimizes or eliminates hunting.

Other objects, advantages and details of our invention will be apparent as the description proceeds, reference being had to the accompanying drawing which shows two forms of the invention. It will be understood that the description and drawing are illustrative only, and are not to be taken as limiting the invention except insofar as it is limited by the appended claim.

In the drawing:

Fig. 1 is a sectional view on line 1—1 of Fig. 2 illustrating a motor embodying one form of our invention;

Fig. 2 is a sectional view on line 2—2 of Fig. 1;

Fig. 3 is a front elevational view of a fragmentary portion of our motor illustrating a second form of our invention;

Fig. 4 is a side elevational view of the portion shown in Fig. 3, and

Fig. 5 is a circuit diagram applicable to both forms of the invention.

Referring to the drawing, our invention is shown applied to a motor which has two frame plates 10 and 11 held in spaced relation by rods 12.

A pair of stationary field structures 15 and 16 are mounted in opposed relation between plates 10 and 11. Field structure 15 in the example shown, comprises a generally U-shaped core 17 which usually is constructed of iron laminations. The legs of core 17 terminate in two arcuate pole faces 18 and 19 which are arranged adjacent the rotational path of an armature, presently to be described. Field structure 15 also includes a field coil 20 which is disposed about one or both of the legs of core 17.

Field structure 16 is a substantial duplicate of structure 15. It has core 22, arcuate pole faces 23 and 24, and field coil 25.

The motor has a rotatable shaft 27 which is journalled in bearings carried on plates 10 and 11. An armature 28 which preferably is constructed of iron laminations is rigidly mounted on shaft 27, and it has a plurality of circumferentially spaced, radially extending pole pieces (Fig. 1). The illustrated armature 28 has three pole pieces designated 29, 30 and 31. Each pole piece terminates in a curved surface which is adapted to rotate in close proximity to the arcuate pole faces 18, 19, 23 and 24 of the field cores.

The pole faces of each core are disposed and spaced relative to armature 28 so that two of the three armature plate pieces can be attracted each time a core is energized. As will be seen, the cores are energized alternately with the result that two of the three armature pole pieces are under attraction by a field core at substantially all times during motor operation.

Field coils 20 and 25 are connected in circuit with a power source such as battery 35. One suitable circuit arrangement is shown in Fig. 5. As there shown, one side 36 of the battery is connected to one side of each of the field coils, while the other side 37 of the battery is connected to the movable contact 38 of a single pole, double throw switch. One stationary contact 39 of the switch is connected to the other side of coil 20, while the other stationary switch contact 40 is connected to the other side of coil 25.

Movable switch contact 38 is adapted to travel back and forth and thus alternately engage the fixed switch contacts 39 and 40. In this manner coil 20 is energized for a period after which the circuit thereto is broken and coil 25 is energized for a period of similar duration. The varying field thus produced drives the armature in a well known manner.

Referring back to Figs. 1 and 2, the switch and actuating reed assembly is designated generally by 45. The assembly is supported by an insulating header arrangement 46 carried by frame plate 10.

A leaf spring reed 48 has its upper end secured in header arrangement 46. The other end of reed 48 carries a permanent bar magnet 50 which has one of its poles facing in the direction of motor shaft 27.

As best shown in Fig. 2, reed 48 carries the movable contact of a single pole, double throw switch. The movable contact (corresponding with contact 38 in Fig. 5) is formed in two parts, namely contact 52 and contact 53. Each contact is carried near the free end of a small spring affixed to reed 48, the two springs being carried one on each side of the reed. Electrically, the two contacts 52 and 53 function as one.

A support 55, carried by header arrangement 46 and insulated from reed 48, has a fixed contact 56 in position to be engaged by movable contact 52. A similar support 58 is disposed on the opposite side of reed 48, and this support carries a fixed contact 59 in position to be engaged by movable contact 53. Fixed contacts 56 and 59 correspond respectively with fixed contacts 39 and 40 shown in the Fig. 5 circuit diagram.

Reed 48 is adapted to vibrate back and forth at its characteristic frequency, and in so doing the two switches, namely, the switch comprising contacts 52 and 56 and the switch comprising contacts 53 and 59, successively close and open. This action produces the previously described varying field.

Reed 48 is driven to vibrate at its characteristic frequency by a magnetic coupling between permanent magnet 50 and a magnetic reed driving member 60 which is rigidly mounted on motor shaft 27. Member 60 is mounted on shaft 27 in spaced relation with armature 28 and in effective relation with magnet 50, as shown in Fig. 2.

In the form of the invention shown in Figs. 1 and 2, magnetic reed driving member 60 is generally circular in shape and it is permanently magnetized. It has a plurality of circumferentially spaced, radially extending pole elements 61 and 62, adjacent pole elements being of opposite polarity. Thus, in the example shown, if pole element 61 is a north pole, pole element 62 is a south pole. Member 60 in the illustrated motor has six pole elements, three noth pole elements and three south pole elements.

As member 60 rotates with shaft 27, the various pole elements 60 and 61 successively pass in close proximity to magnet 50 carried on reed 48. When reed 48 is in its middle position, that is, the position shown in Fig. 2 where both of the switches are open, magnet 50 lies in a plane which is axially offset somewhat from the plane of member 60. The offset is not great, however, and in the usual case magnet 50 in part overlaps member 60 when in middle position, as shown in Fig. 2.

If the pole of magnet 50 which faces reed driving member 60 is the north pole, it will be seen that magnet 50 is attracted laterally toward member 60 when a south pole element 62 is presented to magnet 50, thereby driving the reed to the right as viewed in Fig. 2. When the next successive pole element, a north pole element 61, is presented to magnet 50, the magnet will be repelled to thereby drive the reed to the left. Thus, as member 60 continues to rotate, magnet 50 is alternately attracted and repelled with the result that reed 48 is driven back and forth in successive cycles of substantial amplitude.

The pole elements 61 and 62 of member 60 are angularly spaced in relation to the armature pole pieces 29, 30 and 31 and the field pole faces 18, 19, 23 and 24 so that the respective field structures 15 and 16 are energized and deenergized with proper timing for motor operation. The resilient character of the supports for the various switch contacts 52, 53, 56 and 59 insures that one switch or the other will be closed at substantially all times.

Adjusting means 65 and 66 bear respectively on supports 55 and 58 so that the spacing of the switch contacts may be varied and reed frequency may be accurately tuned. Because of the substantial magnitude of reed amplitude, the adjustment of the spacing between the respective switch contacts is not particularly critical, and, once set, further adjustment is seldom if ever necessary.

In the Figs. 1-2 form of the invention, permanent magnet 50 and magnetized reed driving member 60 both are preferably constructed of a steel alloy, such as that sold under the trademark Alnico, capable of being strongly and permanently magnetized. The provision of these two powerful permanent magnets insures that the motor, when power is removed at the end of the run, will come to rest with one of the pole elements of member 60 adjacent magnet 50. In such position, one of the switches is closed so that when power is next applied, one of the field structures will be energized to start the motor in a self-starting manner. The magnetic force existing between these two magnets substantially exceeds that which is required to overcome the mechanical load normally imposed on the motor.

Referring again to Figs. 1-2, we have found that the constant speed characteristics of our motor is materially improved by the provision of a resilient snubber element disposed in alignment with some moving portion of reed 48 or magnet 50. In Fig. 2, this snubber element, generally designated 70, is located at or just beyond the normal left hand end of the travel path of magnet 50. In the example shown, the element takes the form of a rather stiff spring 71 bent in the form of a U with one leg affixed to frame plate 11 of the motor. The other legs carries at its free end a pad 72 of rubber or the like. This snubber element effectively resists any tendency the reed might have to increase its amplitude and vibrate at a forced frequency rather than at its characteristic frequency.

The form of the invention shown in Figs. 3 and 4 differs from that previously described in the specific character of the magnetic reed driving member. Here, reed driving member 75 is not permanently magnetized; rather, it is made of some magnetic material such as soft iron. Member 75 has pole elements 76, 77, 78, 79 etc. arranged in two axially spaced series. Circumferentially adjacent pole elements, such as elements 76 and 77, lie one in one series and one in the other series, as clearly shown in Figs. 3 and 4.

Reed magnet 80 when in middle position lies on a plane which passes substantially midway between the two series of pole elements. In Fig. 3 magnet 80 is shown in a position to the right of middle position, i. e., it is being attracted to the right by pole element 78 which is passing adjacent magnet 80. As member 75 continues clockwise rotation, pole element 77 is next presented to magnet 80 with the result that magnet 80 moves to the left and correspondingly drives the reed. Thus the reed is driven back and forth through cycles of substantial amplitude.

It will be seen that in both forms of the invention the reed is driven in both directions through a magnetic coupling between the reel magnet and the magnetic reed driving member carried on the motor shaft. This double driving arrangement produces a vibration amplitude which is substantially greater than that experienced in motors constructed in accordance with our prior patents. This increased amplitude has eliminated the need for critical reed and switch contact spacing adjustment, and has insured motor operation for long periods without need for readjustment. Performance of motors embodying both forms of this invention is materially improved through use of a resilient snubber element, as previously described.

From the above description it is thought that the construction and advantages of our invention will be readily apparent to those skilled in the art. Various changes in detail may be made without departing from the spirit or losing the advantages of the invention.

Having thus described our invention, what we claim as new and desire to secure by Letters Patent is:

In a constant speed D. C. motor having a pair of stationary field structures, a field circuit for each field structure including a single pole, double throw switch for alternately energizing and deenergizing said circuits, a rotatable motor shaft with an armature thereon, a vibratable reed for actuating said switch as said reed vibrates, and a reed magnet carried by said reed with one pole thereof facing said shaft: the combination therewith of a non-magnetized reed driving member rigidly mounted on said shaft in spaced relation with said armature, said member having a plurality of circumferentially spaced, radially extending pole elements, said pole elements being arranged in two axially spaced series with circumferentially adjacent pole elements lying one in one series and one in the other series, the portion of said member between said spaced series of pole elements being substantially free of influence on said reed magnet, the middle position of said reed magnet being in a plane which passes substantially midway between the two series whereby said pole elements cooperate with said reed magnet to drive said reed in both directions at its characteristic frequency through successive substantial amplitude cycles.

References Cited in the file of this patent

UNITED STATES PATENTS

| | | |
|---|---|---|
| 1,718,147 | Herrmann et al. | June 18, 1929 |
| 2,228,663 | Knapp | Jan. 14, 1941 |
| 2,266,037 | Henninger et al. | Dec. 16, 1941 |
| 2,282,582 | Henninger et al. | May 12, 1942 |
| 2,473,839 | Altfather | June 21, 1949 |
| 2,538,216 | Stehlik | Jan. 16, 1951 |
| 2,690,646 | Clifford | Oct. 5, 1954 |